March 12, 1940.  J. DECKERT, JR  2,193,394
GEAR SHAFT PUMP ASSEMBLY
Filed March 22, 1939  2 Sheets-Sheet 1
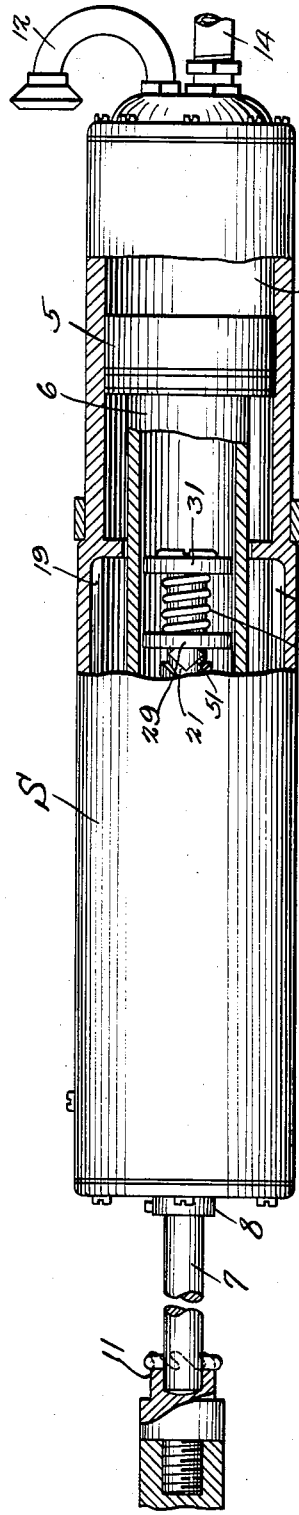
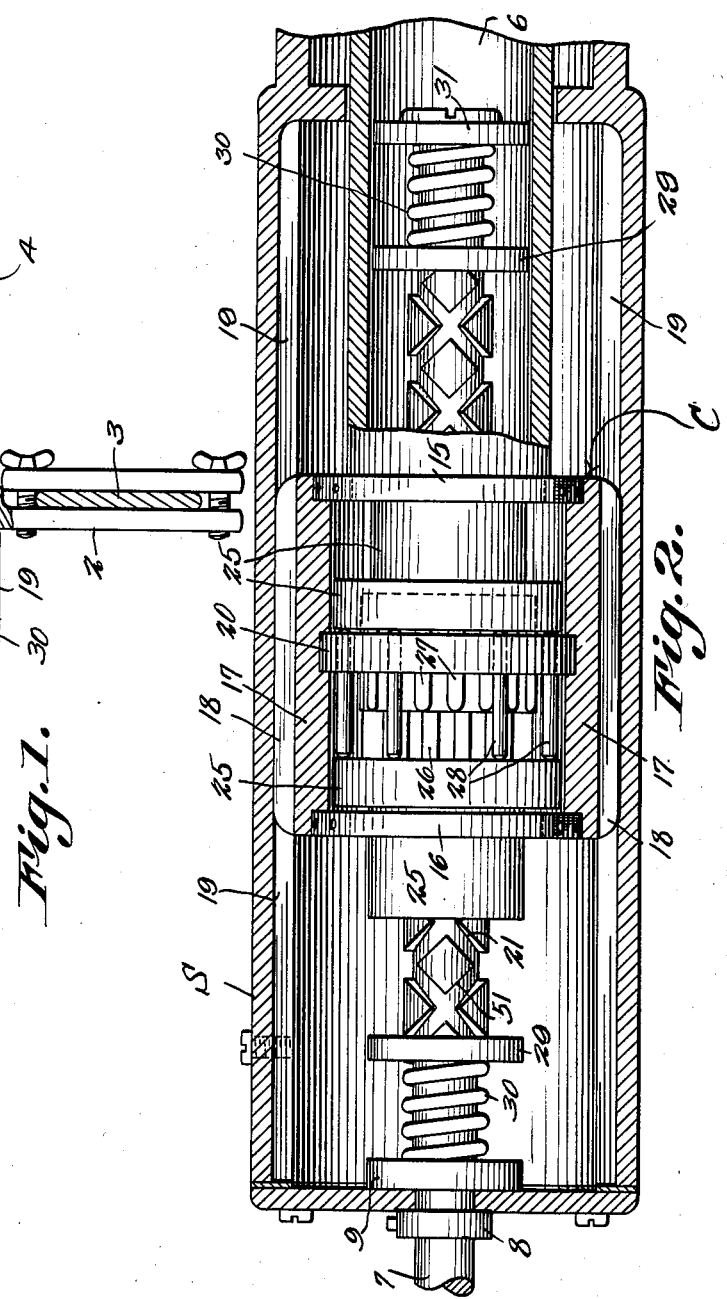
Jacob Deckert Jr.
INVENTOR.
BY C. A. Snow & Co.
ATTORNEYS.

March 12, 1940.  J. DECKERT, JR  2,193,394
GEAR SHAFT PUMP ASSEMBLY
Filed March 22, 1939   2 Sheets-Sheet 2
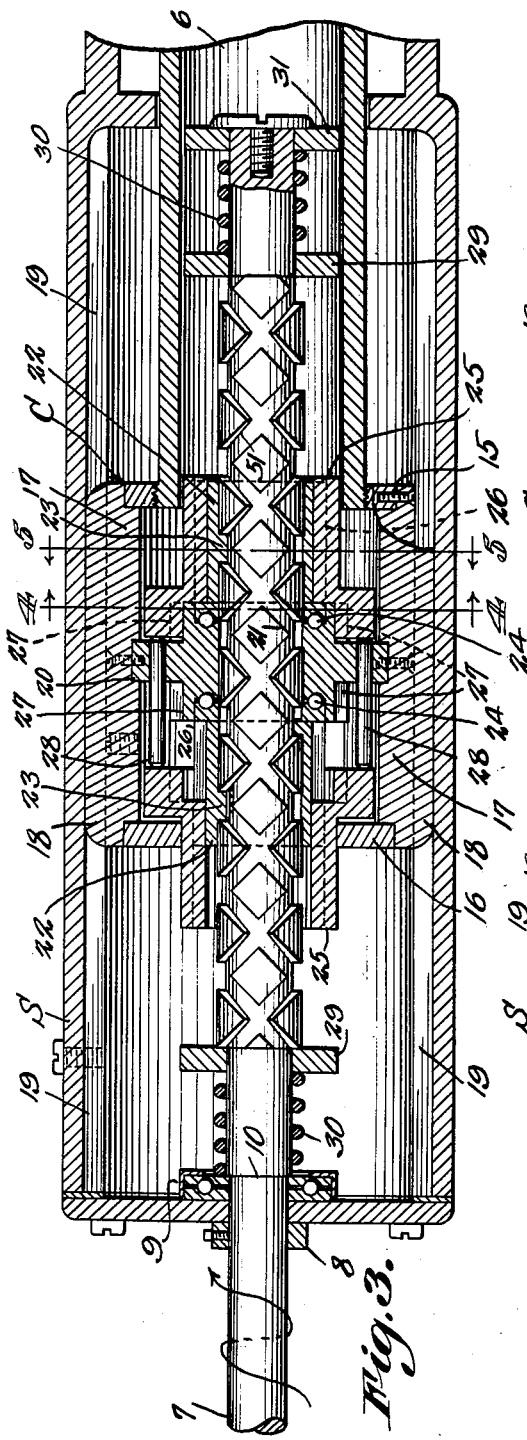
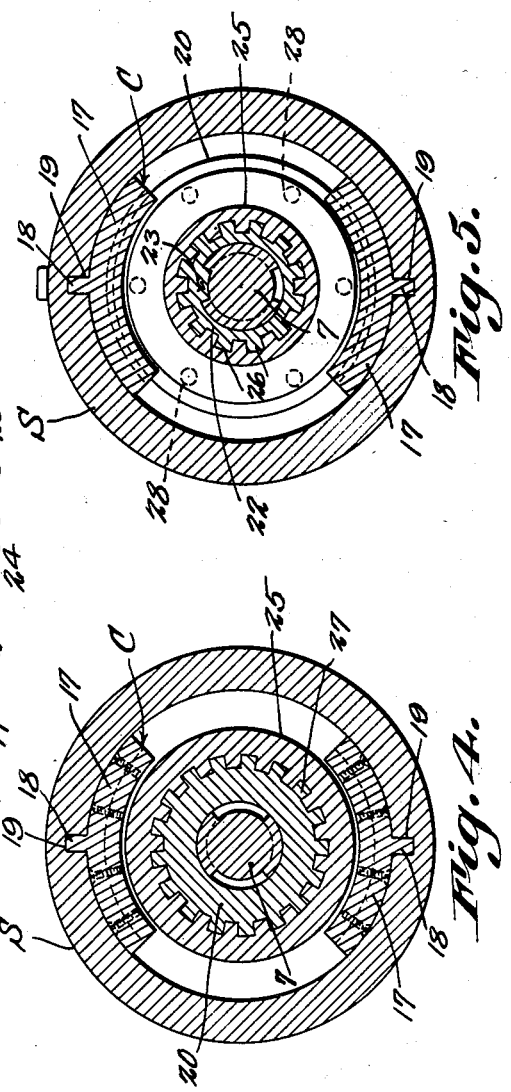
Jacob Deckert Jr.
INVENTOR.
BY *C. A. Snow & Co.*
ATTORNEYS.

Patented Mar. 12, 1940

2,193,394

UNITED STATES PATENT OFFICE 2,193,394

GEAR SHAFT PUMP ASSEMBLY

Jacob Deckert, Jr., Chicago, Ill.

Application March 22, 1939, Serial No. 263,501

3 Claims. (Cl. 74—57)

This invention aims to provide novel means whereby rotary movement in a shaft may be transformed into straight line reciprocation, the structure being of use as a means for operating a pump, and for many other purposes.

It is within the province of the disclosure to improve generally and to enhance the utility of devices of that type to which the present invention appertains.

With the above and other objects in view, which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

In the drawings:

Fig. 1 shows in side elevation, a device constructed in accordance with the invention, parts being in section;

Fig. 2 is a longitudinal section, parts being broken away, and parts remaining in elevation;

Fig. 3 is a longitudinal section of the portion of the device delineated in Fig. 2;

Fig. 4 is a cross section on the line 4—4 of Fig. 3;

Fig. 5 is a cross section on the line 5—5 of Fig. 3.

The device forming the subject matter of this application affords a means whereby, when rotation is imparted continuously in one direction, to a shaft having oppositely-spirally threads, right-line reciprocation will be imparted to a driven member. Since the device is capable of many uses, and since it is desired that it shall not be confined to any particular use, an illustrative utility will be set forth at this place, and then dismissed from further consideration.

A tubular support S is held by a clamp bracket 2 on the bumper 3 of a motor car. In one end of the support S there is a cylinder 4, in which a piston 5 is slidable, the piston being secured to a reciprocatory, tubular, driven member 6. A shaft 7 is mounted for rotation in one head of the support S, but is held against longitudinal movement, through the instrumentality of an external set collar 8 and an internal thrust bearing 9 of the ball type, mounted on the shaft, the aforesaid head of the support being interposed between the collar and the bearing, and the shaft having a retaining shoulder 10 for the bearing. One-way rotation may be imparted to the shaft 7, from the shaft of the engine of a motor vehicle, by way of a clutch 11.

The device forming the subject matter of this application transforms the one-way rotation of the shaft 7 into right-line reciprocation of the driven member 6 and the piston 5, air is drawn into the cylinder 4 through an inlet 12, and is expelled through an outlet 14, and thus a power-operated tire pump is afforded. The user is left free to rotate the shaft 7 by any appropriate means; to take power off the reciprocatory member 6 for any purpose that the work in hand may dictate; and to mount the support S on something other than a motor car.

A composite carriage C is mounted for right-line reciprocatoin in the support S, and embodies rings 15 and 16, the driven member 6 being secured to the ring 15. The rings 15 and 16 are fastened to connecting pieces 17, curved transversely to fit slidably in the support S, the connecting pieces having ribs 18, which are received slidably in longitudinal, internal, track-grooves 19 formed in the support S, the carriage C thus being constrained to straight-line reciprocation. A transverse partition 20 is located within the carriage C and is secured to the connecting pieces 17.

The shaft 7 has oppositely-spiralled thread grooves 21 and 51. Tubular nuts 22 receive the shaft 7 and have inwardly-extended spiral lugs 23 for cooperation, respectively, with the thread grooves 21 and 51. Thrust bearings 24, of the ball type, are carried by the partition 20 and are interposed between the inner ends of the nuts 22 and the partition. Tubular slides 25 receive the nuts 22, and are coupled thereto by cooperating, longitudinal spline elements 26. The slides 25 are adapted to be coupled to the partition 20 of the carriage C by cooperating, longitudinal clutch elements 27. Shift pins 28 or plungers extend between the slides 25 and are mounted for reciprocation in the partition 20.

Yieldably-mounted abutment rings 29 are supported slidably on the shaft 7 and are located on opposite sides of the carriage C. The rings 29 are held against shoulders at the ends of the threaded part of the shaft 7, by compression springs 30, one spring engaging the thrust ball bearing 9, and the other spring engaging a stop 31, secured to the end of the shaft 7. The stop 31, the adjacent spring 30, and the corresponding abutment 29, are disposed within the tubular driven member 6.

Referring to Fig. 3, it is desirable to make a distinction, in explaining the operation, between parts to the right of the carriage-partition 20 and parts to the left of it, but there seems to be no good reason for encumbering the drawings with more numerals than have been used, or with a complicated system of designating characters. It is believed that no confusion will result if, for example, reference is made to "R nut 22", instead of using repeatedly, the more cumbersome phrase: "the nut 22 which is located to the right of the partition 20 of the carriage C".

In Fig. 3, R nut 22 must be held against rotation with respect to the carriage C, so that when the shaft 7 is rotated clockwise, the lug 23 of R nut 22 will follow the groove 21, R nut 22 cooperating with R ball bearing 24, to move the carriage C to the left. R nut 22 is coupled to R slide 25 by R spline elements 26, and R slide 25 is coupled to the carriage partition 20 by R clutch elements 27. L nut 22 must be free to turn, along with L slide 25, so that the lug 23 of L nut 22 can follow the groove 51, and L nut 22 and the L slide 25 can turn, because, due to the action of the shift pins 28, L clutch elements 27 have been disengaged, thus setting L nut 22 and L sleeve 25 free from the carriage partition 20.

As the carriage moves to the left, a time arrives when the L slide 25 engages the L abutment 29 and compresses the L spring 30. While that is going on, the L slide 25 is moved to the right, relatively to the carriage partition 20, and the shift pins 28 are slid to the right, moving the R slide 25 to the right, the R clutch elements 27 being disengaged, and the R slide 25 and the R nut 22 being set free for rotation. By this time, the right end of the L slide 21 has been moved up to the left side of the carriage partition 20. The L spring 30 now reacts and moves the L slide to the right, bringing the L clutch elements 27 into engagement. The L slide 25 and the L nut 22 now are coupled to the carriage partition 20, and function as hereinbefore set forth respecting the R slide 25 and the R nut 22, the carriage C being moved to the right by the cooperation between the lug 23 of the L nut 22. The R abutment 29 in time restores the R slide 25 to the position shown in Fig. 3, that operation being the same as that hereinbefore set forth in connection with the L abutment 29 and parts wherewith it coacts.

What is claimed is:

1. In a machine for transforming rotary motion into right-line reciprocation, a support, a shaft mounted to rotate in the support and having oppositely-spiralled threads, a carriage mounted for right-line reciprocation in the support, means for taking power from the carriage, nuts cooperating with the threads of the shaft, slides held on the nuts for right-line reciprocation, the slides and the carriage having clutch parts which couple the slides one at a time to the carriage, as each slide moves inwardly, shift means operated by either slide, when either slide moves inwardly, to move the other slide outwardly and break the clutch engagement between said other slide and the carriage, and abutments supported in the path of the slides, and engaging the slides, one at a time, as the carriage reciprocates, thereby to clutch-couple the slides, one at a time, to the carriage.

2. A machine for transforming rotary motion into right-line reciprocation, constructed as set forth in claim 1, and wherein the shift means is a plunger, mounted to reciprocate in the carriage, and extended between the slides.

3. A machine for transforming rotary motion into right-line reciprocation, constructed as set forth in claim 1, and wherein the abutments are slidable outwardly and longitudinally of the axis of the shaft, under the thrust of the slides, and spring means for moving each abutment inwardly to clutch-couple either slide to the carriage, after the shift means has broken the clutch-couple between the other slide and the carriage.

JACOB DECKERT, Jr.